United States Patent [19]
Chen et al.
[11] 4,087,825
[45] May 2, 1978

[54] INK JET PRINTING INTENSITY MODULATION

[75] Inventors: Winston Hsong Chen; Stanley Carpenter Titcomb, both of San Jose, Calif.

[73] Assignee: International Business Machines Corporation, Armonk, N.Y.

[21] Appl. No.: 690,763

[22] Filed: May 27, 1976

[51] Int. Cl.² .................... G01D 15/18
[52] U.S. Cl. .................... 346/75
[58] Field of Search .................... 346/75, 1

[56] References Cited

U.S. PATENT DOCUMENTS

| | | | |
|---|---|---|---|
| 3,846,800 | 11/1974 | Chen | 346/75 X |
| 3,911,818 | 10/1975 | MacIlvaine | 346/75 X |
| 3,947,851 | 3/1976 | Chen et al. | 346/75 X |
| 3,955,203 | 5/1976 | Chocholaty | 346/75 |

*Primary Examiner*—George H. Miller, Jr.
*Attorney, Agent, or Firm*—John H. Holcombe; Otto Schmid, Jr.

[57] ABSTRACT

Ink jet print spot intensity is modulated by controlling the volume of ink per print spot to compensate for various paper, environmental and ink characteristics, and thereby attain uniform print quality.

14 Claims, 10 Drawing Figures

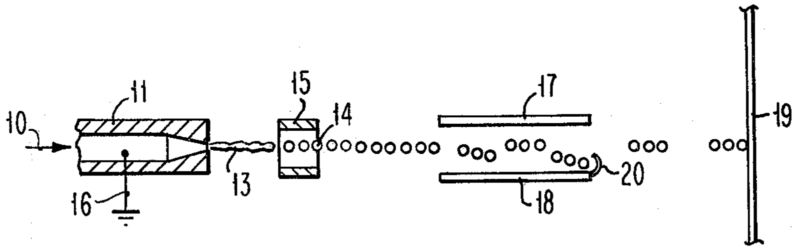
FIG.1
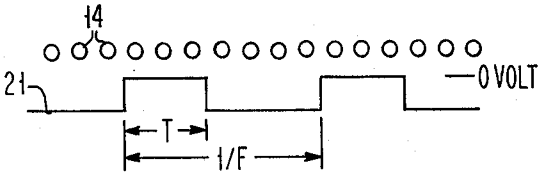
FIG.2
FIG.5
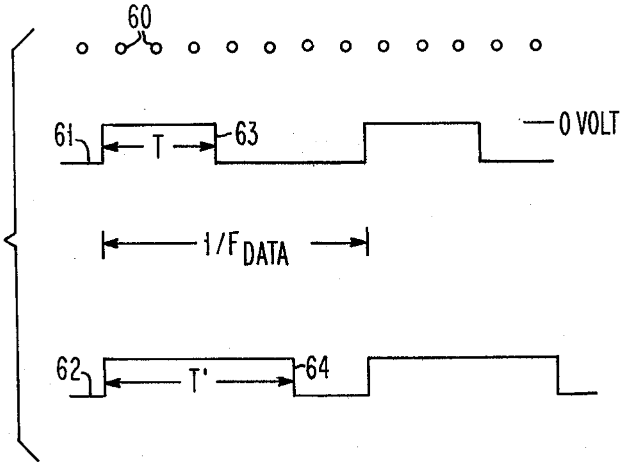

INK JET PRINTING INTENSITY MODULATION

BACKGROUND OF THE INVENTION

In recent years, significant development work has been done in the field of ink jet printing. One type of ink jet printing involves electrostatic, pressurized ink jet, wherein conductive ink is applied under pressure to a suitable nozzle or nozzles. The ink is thus propelled from each nozzle in a stream and is perturbated to cause the jet stream emerging from the nozzle to break into drops at the perturbation frequency and at a predetermined distance from the nozzle. The stream is thus caused to break up into a train of individual drops which must be selectively charged and controllably deflected for printing or to a gutter.

Several examples of such systems exist, one example comprising electrostatic deflected ink jet such as taught by Sweet U.S. Pat. No. 3,596,275, wherein a single stream of drops are selectively charged and passed through a uniform deflection field to impact various locations on a recording medium in accordance with the charge of each drop. Thus, by applying suitable charging signals to the drops, readable printed characters may be formed on the recording surface. Another example comprises electrostatic binary ink jet such as taught by Sweet et al, U.S. Pat. No. 3,373,437. This type of system generates a plurality of jets in one or more rows, selectively charging drops with a single charge level for deflection by a constant field to an ink drop catcher. The uncharged drops continue undeflected along the original jet path to impact the recording surface and form readable printed characters.

The emphasis in such systems has been, and continues to be, on accomplishing proper character and image formation reliably and at reasonable cost.

Ultimately, ink jet printers may be employed for a variety of applications using different paper types for various types of printing. The drops of ink that impact the paper for printing form print spots that spread across and soak into various types of paper in varying degrees. Thus, current ink jet printing provides widely varying print quality for various paper types. One approach at answering the problem may be to provide an ink jet ink having a formulation such that it produces print of intermediate quality on a wide range of papers. However, no such ink is currently available. Another approach may be to limit the types of paper which are usable in the printer to those having the best interaction with to the ink being used. However, a restriction of this type may severely limit the ultimate application of ink jet printers.

Electrostatic pressure ink jet systems have been found to perform more reliably when using inks having water as the basic solvent. Hence, even though a specific type of paper and an ink may be matched, the print quality may depend upon the environmental conditions, such as temperature and humidity. A solution may be to provide an air conditioning system with the printer to ensure that printing only occurrs in a controlled environment. However, such air conditioning systems are generally both bulky and costly.

It is therefore an object of the present invention to provide an ink jet printing system for producing a more uniform print quality on a variety of paper types and in a variety of environments.

SUMMARY OF THE INVENTION

In accordance with the present invention, method and apparatus are provided for compensating for various recording medium, environmental and ink printing characteristics in ink jet printing systems of the electrostatic pressure type. Specifically, a pressurized fluid supplied to at least one nozzle and periodically perturbated to project therefrom a corresponding number of fluid stream filaments, each breaking into a series of drops, which drops selectively impact a recording medium to form print spots, the method and apparatus for determining the print characteristic of the fluid with respect to the recording medium to be printed by the fluid jet drops, and controlling the volume of fluid forming each of the spots in response to the determined print characteristic.

The foregoing and other objects, features and advantages of the invention will be apparent from the following, more particular description of a preferred embodiment of the invention as illustrated in the accompanying drawings.

Brief Description of the Drawings

FIG. 1 is a diagrammatic illustration of an electrostatic binary pressure ink jet system operating in accordance with the present invention;

FIG. 2 is a diagram of the charging signal waveform in accordance with the present invention;

FIG. 5 is a diagram of exemplary waveforms in accordance with one method of the present invention;

DETAILED DESCRIPTION OF THE INVENTION

Figure 3:
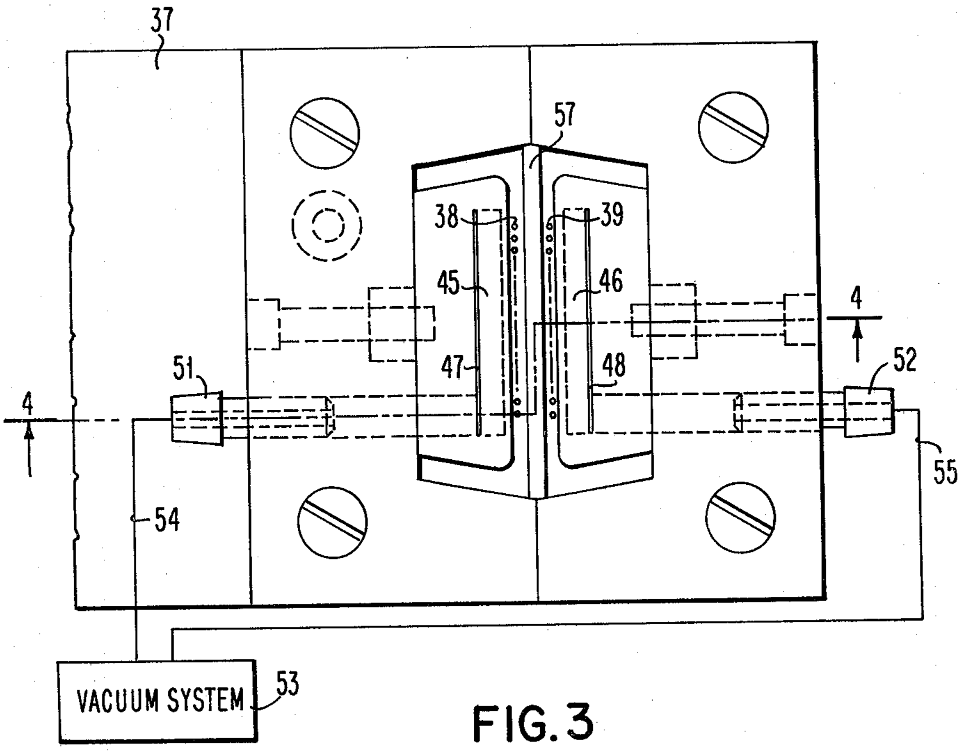
FIG. 3 is a front view of an ink jet head and deflection structure for an ink jet system in accordance with the present invention.

In the previously described electrostatic pressure ink jet printing systems, the drops of ink that impact the paper form print spots that, when taken together, form images or characters that are recognizable as being of high or low quality in dependence upon the way in which the ink spreads across and soaks into the paper. As discussed, this aspect of printing varies considerably over various types of paper and in accordance with varying environmental conditions.

Referring to FIGS. 1 and 2, pressurized electrostatic ink 10 is supplied to a head 11 having a nozzle orifice 12. The pressurized ink is thus forced through the nozzle orifice in the form of a fluid filament 13. The pressure or velocity of the fluid is perturbated at a frequency to cause the fluid filament stream to break into a train of uniformly sized drops 14. Charging electrode 15 is placed in a position surrounding or adjacent the filament stream at the point where drops break off from the filament 13. The pressurized ink 10 in the head is electrically grounded 16, thus grounding the ink in the filament 13. As each drop breaks off from the filament, it assumes the electrical charge induced from the voltage on the charging electrode 15. The drops continue along the path projected from the filament 13, until a deflection field established by a static voltage between deflection plates 17 and 18 is encountered. In the deflection field, drops which are uncharged continue along the original path without being deflected, and impact the paper 19 for printing thereon. The drops which have been charged, however, are caused to be deflected by the deflection field toward deflection plate 18 for interception by gutter 20.

In many ink jet systems, the charge signal data rate of a charge signal 21 is synchronized with the drop generation frequency, such that each drop is individually charged. In the present invention, the charge signal data rate 1/F is equal to a multiple of the drop frequency rate. Further, only a proportion of the drops passing the charge electrode during the print cycle are left uncharged to form a spot on the paper 19. The proportion of the charge data cycle time 1/F in which the drops to form a print spot are left uncharged is represented as T. Thus, should no printing of a spot occur, the charge signal would remain negative for the entire 1/F charge data cycle time. If a spot is to be printed, no charge signal is applied for the period T, but the charge signal is then applied for the remainder of the 1/F data cycle. Assuming that the relative velocity between the ink jet head 11 and the paper 19 is adjusted so that the drops 14 impact the paper 19 at approximately 1 drop diameter center-to-center spacings, the ink from the drops allowed to impact the paper by not being charged will flow together to form a single spot.

Figure 4:
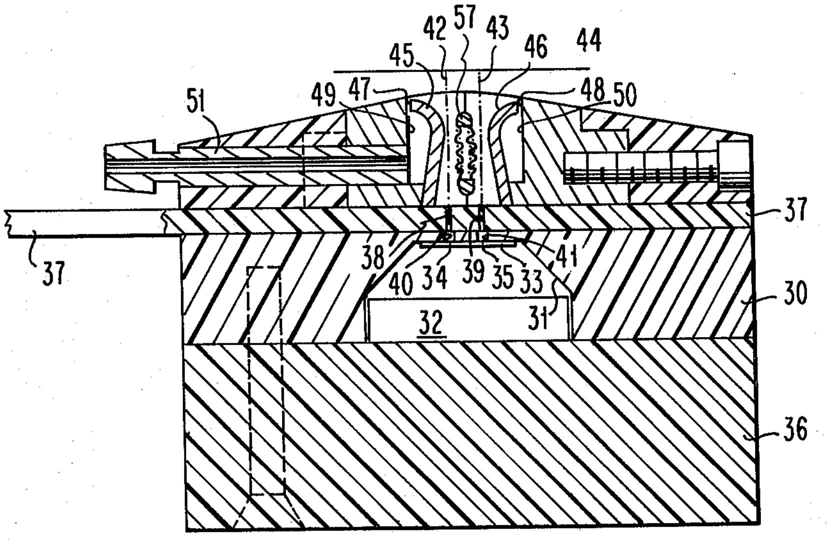
FIG. 4 is a cross-section view of the apparatus of FIG. 3.

FIGS. 3 and 4 illustrate an example of a two-row, multi-orifice, binary electrostatic pressure ink jet head and deflection system. The ink jet head and deflection assembly of FIGS. 3 and 4 is essentially that of co-pending U.S. Pat. application Ser. No. 543,851, filed Jan. 24, 1975, W.L. Chocholaty, now U.S. Pat. No. 3,955,203 assigned in common with the present application. Briefly, the assembly includes a mounting block 30 having a manifold 31 formed therein. Mounted within the manifold are a piezoelectric crystal 32 and an orifice plate 33. The orifice plate includes two rows 34 and 35 of closely spaced ink jet orifices. The piezoelectric crystal 32 is mounted on a backing plate 36. A charge plate 37 is mounted on block 30 and is provided with two rows of charge electrodes 38 and 39, each charge electrode being aligned with a corresponding orifice of the orifice plate 33.

Pressurized ink is supplied to the manifold 31 and is ejected through orifices 34 and 35 of orifice plate 33. The piezoelectric crystal 32 is perturbated by an electrical signal at the drop generation frequency f to vary the internal volume of manifold 31. This perturbates the ink pressure, causing the ink jet streams emanating from orifices 34 and 35 to break into streams of uniform drops. The ink emanates from orifices 34 and 35 in the form of filaments passing through openings 40 and 41 with the perturbations increasing as the distance from the orifice plate 33 increases, until the drops break off from the filaments. Upon the breakoff occurring within the charge electrodes 38 and 39, the drops then assume a charge dependent upon the voltage applied to the corresponding charge electrode at the instant of drop breakoff.

Uncharged drops proceed along paths 42 and 43 to impact recording medium 44. Grounded deflection electrodes 45 and 46 are positioned respectively on opposite sides of drop paths 42 and 43 from high voltage deflection electrode 57. Deflection electrodes 45 and 46 curve away from the drop paths and terminate in openings 47 and 48 which communicate with cavities 49 and 50. The cavities further communicate with tubes 51 and 52 which are connected to a vacuum source 53 by, respectively, lines 54 and 55.

Electrostatic fields established between electrode 57 and electrodes 45 and 46 thus cause charged drops to be deflected from the normal uncharged drop paths 42 and 43 to be directed towards and to contact, respectively, electrodes 45 and 46. Electrodes 45 and 46 therefore also serve as gutters to intercept the drops which are deflected and not used for recording purposes. The intercepted drops flow to the ends of the respective electrodes and are drawn through the respective opening 47 or 48 into cavity 49 or 50 by the vacuum source 53. Accumulated ink is drawn from cavity 49 or 50 through the respective tube 51 or 52 to the vacuum source 53. The ink may then be recycled for subsequent recording use.

The drops 14 which are not charged during the period T in FIG. 2 for each ink jet drop stream and proceed along the corresponding drop paths 42 and 43 to impact the paper 44 form print spots that spread across and soak into the paper. The degree of spreading and the degree of soaking varies in accordance with various types of paper and in accordance with various environments.

The subject invention contemplates the modulation of ink jet print spot intensity by controlling the volume of ink per print spot to thereby compensate for the various paper and environmental characteristics and thereby attain a more uniform print quality.

The preferred technique for controlling the volume of ink per print spot is illustrated in FIG. 5. Ink jet drop stream 60 is illustrated along with charge signals 61 and 62. The drop generation frequency, or drop rate, $f_d$ is significantly higher than the data frequency $F_D$. The drop generation frequency is shown to generate one drop per cycle in drop stream 60 and the time required for one data cycle is represented as $1/F_{Data}$. It can thus be seen that a large number of drops pass the charge electrode during one data cycle, the drop generation frequency being several multiples higher than the data frequency.

In this technique, the intensity modulation is achieved by varying the data pulse width T. The other machine parameters are kept constant, comprising the drop generation frequency, the printhead to paper velocity, the jet velocity, and drop size.

For paper that requires a higher intensity, the data pulse width T is increased so that a higher number of drops is used for printing a spot. Thus, a data pulse width such as shown for data pulse 63 and charge signal 61 is employed for paper "A," being of such width as to allow three drops to be uncharged per spot during a print cycle. The three drops thus will impact the paper sequentially, forming a single spot. For a paper "B" that requires a higher intensity, the data pulse width T′ is increased so that a higher number of drops are used for printing a spot. Thus, the data pulse width 64 and charge signal 62 would be used for paper "B," allowing five drops to be uncharged per print cycle.

Figure 6:
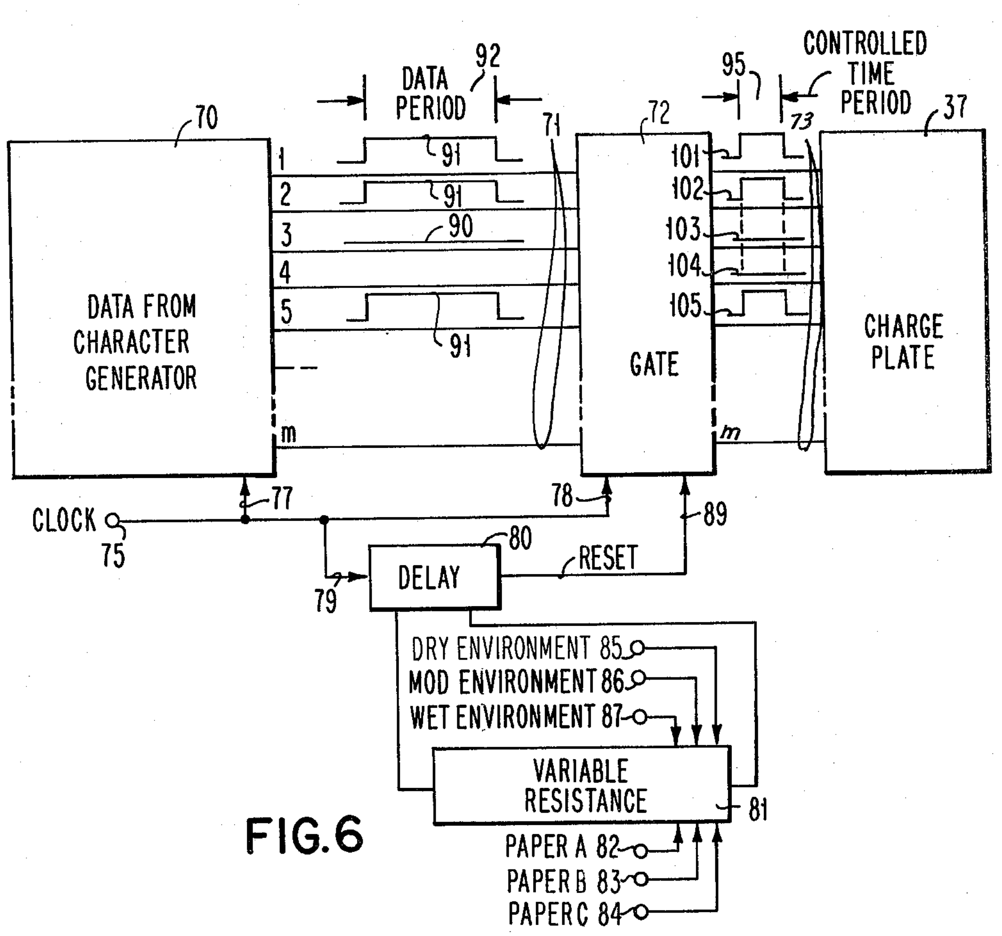
FIG. 6 is a diagram of exemplary charge signal generation control circuitry in accordance with the present invention.

Circuitry for accomplishing the intensity modulation technique of FIG. 5 is shown in FIG. 6. Data from a character generator 70 is provided over a series of lines to gate 72. Each of the lines 1 through *m* in grouping 71 corresponds to an individual charge electrode in rows 38 and 39 of charge plate 37 in FIGS. 3 and 4. The gate circuit 72 is connected by lines 73 to the charge plate 37. A data clock input 75 supplies clock pulses 76 to input 77 of character generator 70, input 78 of gate circuit 72 and input 79 of a delay circuit 80. Delay circuit 80 includes a variable resistance 81 having several switchable inputs 82–87. For example, switchable inputs 82–84 may represent various paper types, each representing a change in resistance twice that of inputs 85–87 which may represent different environments.

The variable resistance thus controls the amount of delay to be produced by delay circuit 80 in responding to a clock pulse at input 79 by providing at the indicated delay time a reset pulse 88 on line 89 to gate circuit 72.

Figure 7:
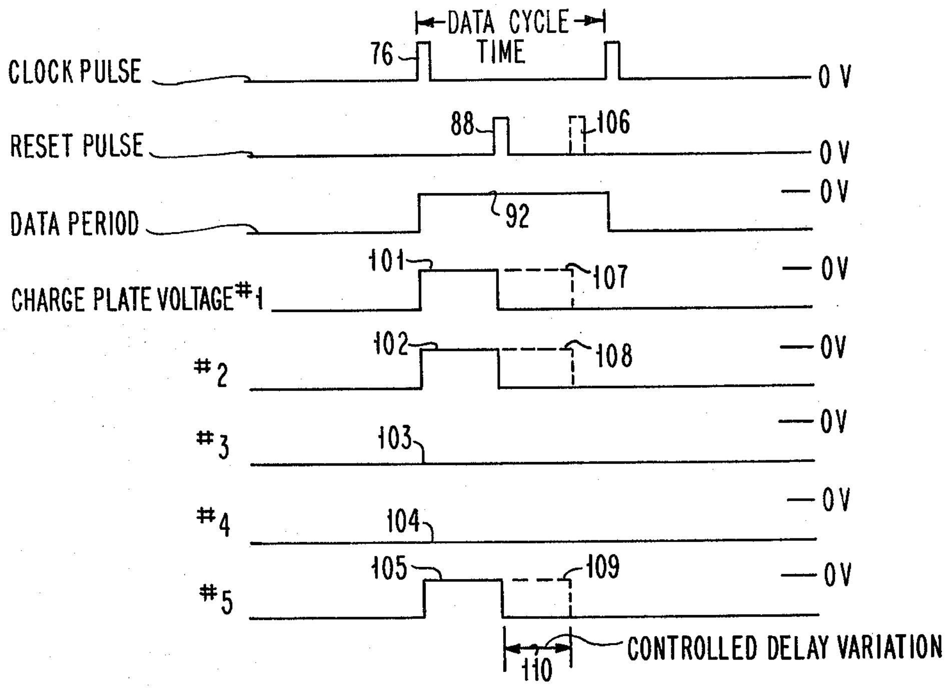
FIG. 7 comprises a series of waveforms illustrating signals of the disclosed embodiment of the invention including the circuitry of FIG. 6.

In operation, character generator 70 responds to the clock pulse 76 in FIG. 7 by supplying charge signals 90 and zero voltage print signals 91 in FIG. 6 for the data period 92. Gate circuit 72 responds to the clock pulse 76 by transmitting the charge or print signls 90, 91 from lines 71 to line 73. Delay circuit 80 responds to the same clock pulse by providing reset pulse 88 at the delay time as determined by the setting of variable resistance 81. The reset pulse 88 on line 89 operates gate circuit 72 to terminate the print signals 91 prior to the end of the data period. Thus, gate circuit 72 supplies the print signals for only a controlled time period 95. Examples of the print and charge signals supplied on various ones of the lines 73 to charge plate 37 are shown as, respectively, signals 101–105. The exemplary signals are shown with the variable resistance such that the delay of delay circuit 80 resulting in reset pulse 88 is at a minimum. Should the delay be set at the maximum to thereby print with a maximum number of drops, the reset pulse would appear as pulse 106 in FIG. 7. The exemplary print signals of FIG. 7 would therefore be extended as shown by the dotted lines 107-109. Thus, delay circuit 80 provides a controlled delay variation 110 as shown in FIG. 7.

By controlling the delay of delay circuit 80, the number of drops to be allowed to impact the recording medium out of the data period 92 is controlled, thereby controlling the volume of ink per print spot.

Figure 8:
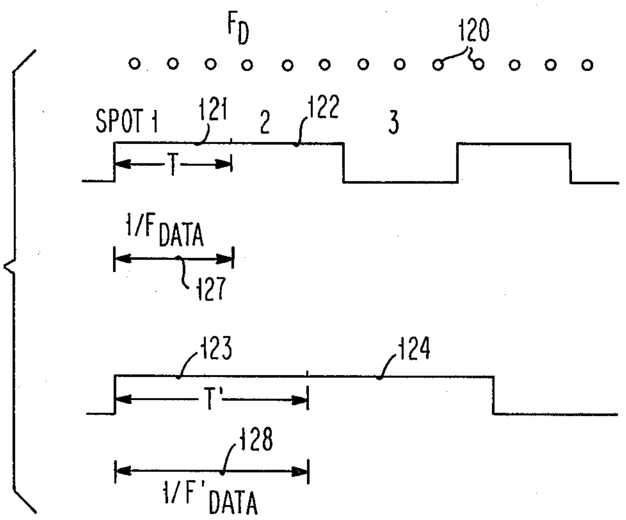
FIG. 8 is a diagram of exemplary waveforms in accordance with another technique of the present invention.

FIG. 8 illustrates another scheme for controlling the volume of ink per print spot. Here, the drop frequency, jet velocity and drop size are kept constant, as in the first scheme above. However, the intensity modulation is achieved by changing the print pulse width T, the data frequency, and the relative print-head to paper velocity simultaneously. Thus, the drop stream 120 remains constant as do drop frequency, velocity and drop size. To modulate the intensity, the print pulses 121 and 122 for paper "A" may be expanded as shown by print pulses 123 and 124 for paper "B," while the data frequency represented by the time period 127 and the print speed are both lowered proportionately as represented by the expanded cycle time 128. As seen, for higher intensity printing, the head thus slows down as the data rate is decresed and the print pulse width is increased so that more drops are available for printing a spot. The print pulse width T need not be equal to the full data cycle time 127 or 128, but this system would be used where the machine design does not allow the drop frequency to be significantly higher than the data rate. Fewer drops should therefore be guttered and it is likely that the better approach is to utilize all of the available drops during the data cycle for printing.

Figure 9:
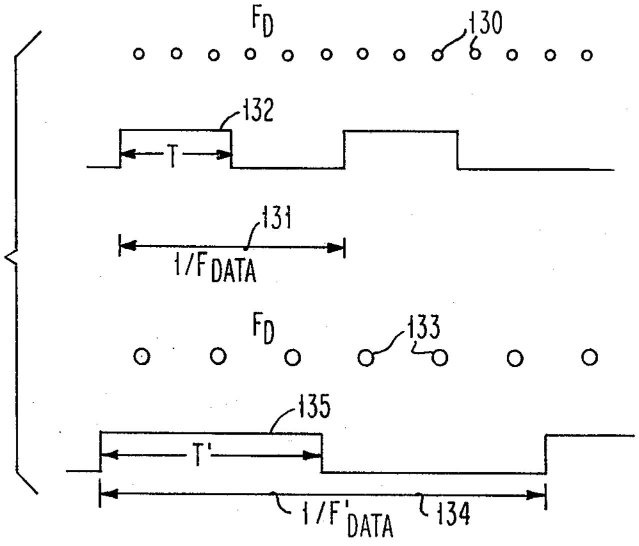
FIG. 9 is a diagram of exemplary waveforms in accordance with still another technique in accordance with the present invention.

Still another technique is illustrated in FIG. 9. Here, the parameters of jet velocity and the number of drops per spot are kept constant. To modulate the intensity, the drop and data frequencies, the print pulse width and the relative head-to-paper velocity are changed. For paper "A," the drop size and drop rate of the ink jet drop stream 130, the data rate as shown by cycle 131, and the print pulse width T for pulse 132 are all as shown. For higher intensity printing, the frequencies and the head velocity are lowered to produce the drop stream 133, while the data rate of cycle 134 and the pulse time of print pulse 135 are all altered. As the result, a spot is printed by larger drops 133 and the print speed and data rate are lower.

Figure 10:
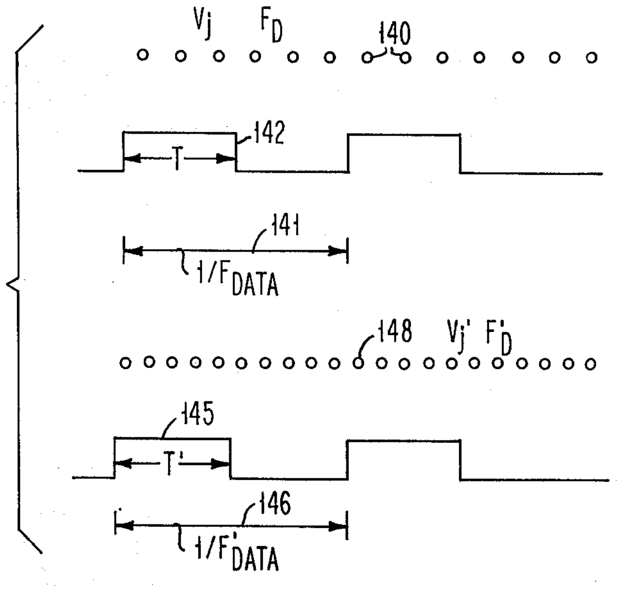
FIG. 10 is a diagram of exemplary waveforms illustrating a further technique in accordance with the present invention.

FIG. 10 illustrates one more technique. Here, the data rate, print pulse width and head velocity are kept constant, the intensity modulation being accomplished by varying the jet velocity and drop frequency. For paper "A," drop stream 140 has the velocity and drop rate as shown, employs the data frequency as shown by the cycle width 141, and employs the print pulse width T of pulse 142. For higher intensity as required for paper "B," the same print pulse width is used for pulse 145 and the same data frequency as shown by data cycle 146. The drop stream 148 however has both a higher jet velocity and a higher drop rate, resulting in a higher number of drops per spot. The intensity modulation therefore accomplishes the impacting of a greater number of drops and therefore a greater volume of ink per spot for the drop stream 148.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. The method of operating an ink jet printing system of the type wherein a pressurized fluid is supplied to at least one nozzle orifice and periodically perturbated to project therefrom a corresponding number of fluid filaments, each of which breaks into a series of drops, which drops are selectively caused to impact a recording medium to form print spots, the method comprising:

determining the print characteristic of said fluid with respect to the recording medium to be printed by said ink jet drops; and controlling the volume of said fluid forming each of said print spots in response to said determined print characteristic.

2. The method of claim 1 wherein said volume controlling step additionally comprises:

controlling the number of said drops of said series caused to impact said recording medium in sequence to form each said print spot.

3. The method of claim 1 wherein said volume controlling step additionally comprises:

controlling the fluid volume of each of said drops of said series.

4. The method of adjusting the print intensity of an ink jet printing system of the type wherein a pressurized fluid is supplied to at least one nozzle orifice and periodically perturbated at a drop generation rate to project from said nozzle orifices a corresponding number of fluid filaments, each of which breaks into a series of drops at said drop generation rate forming a drop stream, which drops are selectively caused by print signals to impact a recording medium to form print spots, said print signals occurring at a data rate, the remainder of said drops being directed to an interception means preventing impact thereof with said recording medium, the method comprising:

establishing said data rate lower than said drop generation rate;

determining the print characteristic of said fluid with respect to the recording medium to be printed by said ink jet drops; and controlling the proportion of the full cycle of said data rate allowed for each of said print signals in response to said determined print characteristic to thereby control the number of said drops to be selected by said print signals for controlling said print intensity.

5. The method of claim 4 wherein:

said nozzle orifices and said recording medium are subjected to a relative motion; and said controlling step comprises controlling said data rate and the velocity of said relative motion proportionately and simultaneously to thereby control the number of said drops to be selected by said print signals for controlling said print intensity.

6. The method of claim 4 wherein:

said nozzle orifices and said recording medium are subjected to a relative motion; and said controlling step comprises controlling said drop generation rate, said data rate, and the velocity of said relative motion proportionately and simultaneously to thereby control the fluid volume of said drops to be selected by said print signals for controlling said print intensity.

7. The method of claim 4 wherein:

said controlling step comprises controlling said drop generation rate and the velocity of said fluid filaments and said series of drops proportionately and simultaneously to thereby control the number of said drops to be selected by said print signals for controlling said print intensity.

8. The method of claim 4 wherein:

said establishing step additionally comprises establishing said data rate at a ratio of no more than ½ said drop generation rate; and said controlling step additionally comprises controllably gating said print signals for a variable proportion of the full cycle of said data rate.

9. The method of claim 8 wherein:

said controlling step variable proportion is variable between a minimum proportion of said full cycle equal to two cycles of said drop generation rate and a maximum proportion equal to said full cycle of said data rate.

10. In an ink jet printing system comprising at least one nozzle orifice, fluid supply means for supplying a pressurized fluid to said nozzle orifices to project therefrom a corresponding number of fluid filaments, perturbation means for periodically perturbating said fluid at a drop generation rate to break each said fluid filament into a series of drops forming a drop stream, print control means responsive to print signals to selectively cause said drops to impact a recording medium to form print spots, and interception means for preventing the remainder of said drops from impacting said recording medium, the improvement for adjusting the print intensity of said print spots comprising:

data means for selectively supplying said print signals at a data rate lower than said drop generation rate;

variable control means for controlling the time period of said print signals, said time period comprising no more than a full cycle of said data rate; and means for providing an input to said variable control means indicative of a print characteristic of said fluid with respect to the recording medium, said variable control means responsive to said input means for controlling the number of said drops to be selected by said print signals.

11. The apparatus of claim 10 wherein:

said variable control means additionally comprises a gating means connecting said data means to said print control means for gating said print signals to said print control means for said controlled time period each cycle.

12. The apparatus of claim 11 wherein:

said variable control means additionally comprises a variable delay means operable each said cycle to control the termination of said gating of said gating means, thereby controlling said time period.

13. The apparatus of claim 11 wherein:

said data means is additionally arranged to supply said print signals at a data rate no more than ½ said drop generation rate.

14. The apparatus of claim 13 wherein:

said variable control means is additionally arranged to vary said time period from said full cycle maximum to a minimum time equal to two cycles of said drop generation rate.

* * * * *